United States Patent [19]

Möller et al.

[11] 4,389,226
[45] Jun. 21, 1983

[54] OPEN HEATED BOX TRAYS HAVING FLOW-PROMOTING DEVICES

[75] Inventors: Eckhard Möller; Horst-Dieter Bures; Karl-Heinz Magosch, all of Marl; Bernt Kesper, Dorsten; Edgar Muschelknautz; Roland Vogelsgesang, both of Leverkusen, all of Fed. Rep. of Germany

[73] Assignee: Chemische Werke Huls Aktiengesellschaft, Marl, Fed. Rep. of Germany

[21] Appl. No.: 316,646

[22] Filed: Oct. 30, 1981

[30] Foreign Application Priority Data

Nov. 5, 1980 [DE] Fed. Rep. of Germany ....... 3041632

[51] Int. Cl.³ .................. B01D 19/02; B01J 12/00; B01B 1/02
[52] U.S. Cl. .................................. 55/208; 55/178; 422/195; 422/200; 422/310; 165/116; 126/378; 202/176
[58] Field of Search ............... 55/175, 176, 178, 190, 55/192, 195, 193, 208; 422/195, 198, 200, 308, 310; 159/13 R, 15, 28 P; 202/176; 126/378, 383, 384, 390; 165/116

[56] References Cited

FOREIGN PATENT DOCUMENTS

| 2649238 | 5/1978 | Fed. Rep. of Germany | 159/15 |
| 891104 | 2/1944 | France | 55/208 |
| 716983 | 2/1980 | U.S.S.R. | 55/93 |

Primary Examiner—David L. Lacey
Attorney, Agent, or Firm—Antonelli, Terry & Wands

[57] ABSTRACT

A flow-promoting device in combination with a heated box tray open at the top in a reaction and degasification column in which a viscous or highly viscous liquid is flowing from an inlet end to an outlet end of the tray and in which a heating tube register is located to be completely covered by the liquid. The tube register includes a plurality of heating tubes spaced from each other, and the flow-promoting device has a bottom heating unit for the box tray positioned outside and along the bottom of the tray, a siphon plate mounted on the tray at a liquid inlet end of the tray and closely in front of the tube register, with the siphon plate having a bottom end extending to the underside of the tube register, and a weir positioned at the liquid outlet end of the box tray. The weir has a top edge extending at least to the topside of the tube register, and the spacing of the weir from the tube register is larger than the spacing of the siphon plate at the inlet end from the tube register.

3 Claims, 1 Drawing Figure

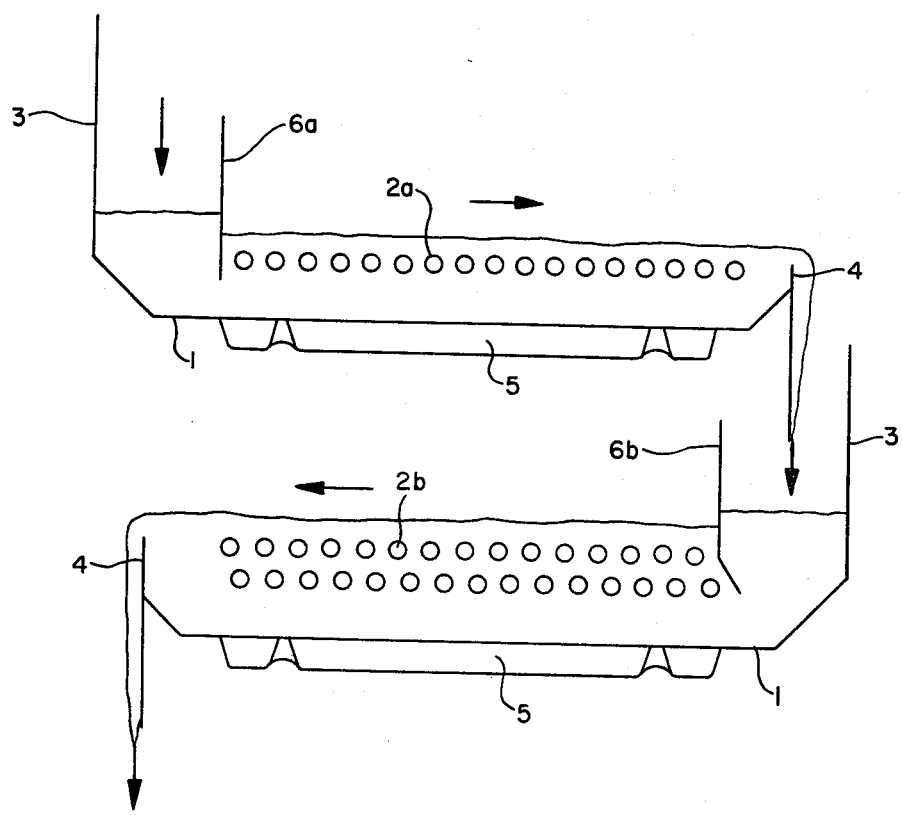

OPEN HEATED BOX TRAYS HAVING FLOW-PROMOTING DEVICES

This invention relates to flow-promoting devices for open, heated box trays in reaction and degasification columns for viscous liquids.

The invention pursues the objective of obtaining a flow pattern advantageous for the quality of the viscous liquid by forced guidance of the flow by means of flow-enhancing or promoting devices. Said viscous liquid may be for example a partially polymerized or polycondensated product having a viscosity between 0.1 and 50 Pa·s.

In endothermal chemical processes and during evaporation steps conducted on box trays, the liquid flowing over the box trays is being heated. The heat exchanger suitable for this purpose is generally designed as a single- or multiple-layer tube register disposed above the bottom plate of the box tray; this tube register is to be exposed to the flow of the liquid on all sides. Such tube registers have only a small spacing for example 50 mm from the bottom plate of the box tray on the underside. The liquid layer is usually about as thick as the tube register.

To provide a large area for heat transfer on the tube register, the tubes are packed together relatively closely. However, such a tube register obstructs or prevents the flowing of the liquid between the tubes in case of viscous or highly viscous liquids; such a register does not permit a uniform heating of the liquid and divides the liquid stream into two areas having very different flow patterns: the flow between the bottom plate of the box tray and the tube register can be called a Couette flow (see H. Schlichting, Grenzschicht-Theorie, Verlag Braun, Karlsruhe, Third Edition, 1958, page 66, chapter 5a, paragraph 1); the flow above the tube register can be designated as a flow in an open flume or channel.

The flow resistance in case of viscous liquids is differently high in the two flow areas, whereby also the mean velocities in these two flow areas become very different. Moreover, the boundary layer directly on the bottom plate exhibits an extremely long residence time in case of viscous liquids as compared with the flow layers (strata) above the boundary layer of this flow region, because the boundary layer adheres to the bottom plate, and the temperature gradient between the tube register and the bottom plate is unfavorable.

Thus, the problem presents itself how to uniformly heat viscous and highly viscous liquids on a box tray equipped with an immersed tube register and how to reach a narrow residence time distribution of the flow layers.

This problem has been solved by this invention which provides:

(a) an additional bottom heating unit below the bottom plate of a box tray provided with a single- or multi-layered tube register for heating liquid within the tray;

(b) a siphon plate mounted on the liquid inlet side of the tray at a position near a front of the tube register, the bottom edge of this siphon plate extending to the underside of the tube register; and (c) a weir on the outlet side of the box tray; the top edge of this weir extending at least to the topside of the tube register, and the spacing of the weir from the tube register being larger than the spacing between the siphon plate on the inlet side and the tube register.

The spacing between the siphon plate and the outside of the first tube in each tube layer of the register is preferably about as large as the gap width between the tubes. The spacing of the generally angled weir from the outside of the last tube in each tube layer is preferably about ten times as large as the gap width between the tubes. The spacing between the underside of the tube register and the bottom plate is preferably about five times as large as the gap width between the tubes. The upper edge of weir may extend somewhat above the topside of tube register for up to 70% of spacing between an underside of tube register and an upper surface of the bottom plate of the box tray.

It will be understood that the tubes in each tube layer of the tube register are spaced uniformly from each other and that the tubes of one layer may be staggered with respect to the tubes of another layer (triangular tube arrangement). Also, the tube layers are generally horizontally arranged with the tube layers being uniformly spaced vertically from each other. The outer diameter of the tubes is for example $d=5$ mm to 30 mm, the distance between the surfaces of adjacent tubes varies for example from $0.3 \cdot d$ to $3 \cdot d$.

The bottom heater of the box tray is a conventional jacket heater. A heat-transfer medium—for example one of the well known suitable organic heat-transfer media—flows through this heater; the temperature and throughput of this medium can be selected independently of the heat-transfer medium that is circulated through the tube register.

The present invention has the following advantages:

The residence time distribution of the liquid flowing over the box tray is small even if the liquid is viscous or highly viscous. Thus, a constant product quality is achieved for all flow strata, insofar as this quality is dependent on temperature and residence time. There are no excessively long residence times which represent a cause for quality deteriorations of the viscous liquid. The width of residence time distribution is assessed by the ratio between the residence time of the upper 10% of throughput of liquid (upper tail of residence time distribution) to the mean residence time. This ratio is for example 1.25 for a box tray according to the invention and 2.85 for the same box tray without additional bottom heater and without siphon plate. These figures show the remarkable reduction of width of residence time distribution using box trays according to the invention in comparison with conventional box trays.

Surprisingly, a single siphon plate arranged in accordance with the invention on the inlet side, together with the other features of the invention, is sufficient to urge the viscous or highly viscous liquid through several layers of the tube register, even if the tube register in the flow direction of the liquid has a width of up to 1.5 m. Even one such siphon plate is sufficient to prevent the flow mode of the open flume (i.e. channel or trough) above the tube register.

The open box tray equipped with the devices of this invention permits the free egress of gases from the viscous liquid. These gases either may be liberated by desorption or constitute gaseous reaction products of a reaction occurring in the liquid.

By the bottom heating feature, a convection flow is additionally generated in the substantially horizontally flowing liquid, whereby the formation of regions of inadequate small flow velocity (dead liquid zones or stagnant volumes) is prevented and the boundary layer is "erased by convection". The following figures elucidate the improvement of temperature distribution within the viscous liquid.

|  | Box trays according to the invention | Ordinary box trays without additional features |
|---|---|---|
| Temperature of liquid | | |
| just below one tube of lower layer of tube register | 280° C. | 280° C. |
| in the middle between lower tube layer and bottom plate of box tray | 276° C. | 275° C. |
| just above bottom plate of box tray | 280° C. | 273° C. |

The apparatus of this invention is described by way of an illustrated embodiment in the sole FIGURE of the accompanying drawing, which is a side elevation of the apparatus. Two box trays 1 are shown (in the FIGURE), of the plurality of horizontally arranged box trays present within a column. One box tray is equipped with a single-layer tube register 2a, the other box tray with a two-layer tube register 2b. Each tray exhibits on the inlet side or end a protective plate 3 and on the outlet side an angled weir 4. The bottom heater 5 is arranged underneath the bottom plate of the tray. On the inlet side, a siphon plate is provided which can be a planar plate 6a in case of a single-layer tube register or can suitably be an angled plate 6b in case of a two-layer tube register wherein the tubes are staggered. The main flow direction of the liquid through the column from one tray to the next lower tray is indicated by arrows.

What is claimed is:

1. An apparatus for heating a viscous or highly viscous liquid the apparatus comprising a heated box tray, inlet means and outlet means in the heated box tray for enabling the liquid to flow therethrough, a heating tube register located in the heated box tray so as to be completely covered by the liquid, and a flow promoting means arranged in the heated box tray for promoting the flow of liquid therethrough, said heated box tray including a bottom plate and being open at a top end thereof, said tube register comprising a plurality of heating tubes spaced from each other and arranged in at least one tube layer, said flow promoting means comprising:
   a bottom heating unit arranged below the bottom plate of the box tray, the bottom heating unit being positioned outside and along a bottom surface of said box tray;
   a siphon plate mounted on said box tray at the inlet means at a position spaced from a front of the tube register, said siphon plate having a bottom end extending to an underside of the tube register; and
   a weir spaced from the tube register and positioned at the outlet means of the box tray, said weir having a top edge extending at least to a top side of the tube register, the spacing between said weir and the tube register being larger than the spacing between the siphon plate at the inlet means and the tube register.

2. An apparatus according to claim 1, wherein said siphon plate is spaced from an outside of a first tube of each tube layer of the tube register by a distance that is approximately as large as a width of the space between the tubes in said tube register.

3. An apparatus, according to claim 1, wherein said weir is spaced from the tube register by a distance that is about ten times as large as a width of the space between the tubes in said tube register.

* * * * *